United States Patent
Furem

(10) Patent No.: US 7,622,884 B2
(45) Date of Patent: Nov. 24, 2009

(54) METHODS FOR MANAGING ELECTRICAL POWER

(75) Inventor: Ken Furem, Cumming, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 12/121,837

(22) Filed: May 16, 2008

(65) Prior Publication Data

US 2008/0212344 A1    Sep. 4, 2008

Related U.S. Application Data

(63) Continuation-in-part of application No. 11/224,907, filed on Sep. 13, 2005, now Pat. No. 7,375,490.

(60) Provisional application No. 60/609,764, filed on Sep. 14, 2004.

(51) Int. Cl.
    *H02P 27/04* (2006.01)
(52) U.S. Cl. .................. 318/801; 318/625; 318/375
(58) Field of Classification Search ............ 318/801, 318/625, 375, 376, 700, 372
    See application file for complete search history.

(56) References Cited

U.S. PATENT DOCUMENTS

| | | | |
|---|---|---|---|
| 3,943,429 A | | 3/1976 | Heintze |
| 4,251,752 A | * | 2/1981 | Stolz ................ 315/206 |
| 6,148,019 A | | 11/2000 | Fishman |
| 2004/0055185 A1 | | 3/2004 | Onsager |
| 2004/0223346 A1 | | 11/2004 | Rayner |
| 2006/0177289 A1 | | 8/2006 | Bonora |

FOREIGN PATENT DOCUMENTS

| | | |
|---|---|---|
| EP | 0520500 | 4/1997 |
| WO | WO01/93410 | 12/2001 |

* cited by examiner

*Primary Examiner*—Karen Masih
(74) *Attorney, Agent, or Firm*—Michael J. Wallace

(57) ABSTRACT

Certain exemplary embodiments comprise a system comprising a plurality of Active Front End units adapted to be electrically coupled to a direct current (DC) bus. Each of the plurality of Active Front End units can be adapted to be electrically coupled to a separate winding of a transformer of a plurality of transformers. Each of the plurality of Active Front End units can be adapted to convert alternating current (AC) voltage to a DC voltage. Each of the plurality of Active Front End units can be adapted to supply the DC voltage to the DC bus. The DC bus can be adapted to be electrically coupled to a plurality of inverters.

21 Claims, 5 Drawing Sheets

METHODS FOR MANAGING ELECTRICAL POWER

CROSS-REFERENCES TO RELATED APPLICATIONS

This application is a continuation of, claims priority to, and incorporates by reference herein in its entirety, U.S. Non-Provisional patent application Ser. No. 11/224,907 filed 13 Sep. 2005, which claims priority to U.S. Provisional Patent Application 60/609,764 filed 14 Sep. 2004.

BACKGROUND

Harmonic distortion can occur when switching a power device in a circuit. For example, harmonic distortion can occur in circuits providing power to a motor comprised in a machine.

Electrical systems associated with the machine can comprise motor controls, and other high powered electrical systems (e.g., above 2 MW). In particular, the machine can comprise Active Front End units, which can also be referred to as Self-Commutating Rectifiers. In certain electrical systems, Active Front End units (AFE's) can convert alternating current (AC) to direct current (DC). The Active Front End units can be switched at a pre-determined rate. The switching of these currents can result in current harmonics in an AC circuit providing power to the Active Front End units.

Conventional systems and methods can attempt to resist and/or correct harmonic distortion by filtering current on an AC bus. These conventional systems and methods can comprise large static filters, which can be relatively costly and inefficient. Conventional systems can occupy excessive space in a circuit. Additionally, filters can be sized for external loads. Also, transformer phase shifting can occur when utilizing a conventional system and method. Hence, a system and method for a managing electrical power and/or resisting harmonic distortion is disclosed.

SUMMARY

Certain exemplary embodiments can comprise a system adapted to manage electrical power, such as by resisting harmonic distortion while supplying power to an AC motor. The system can comprise a plurality of Active Front End units adapted to be electrically coupled to a direct current (DC) bus. Each of the plurality of Active Front End units can be adapted to be electrically coupled to a predetermined distinct winding of a transformer of one or more transformers. Each of the plurality of Active Front End units can be adapted to convert alternating current (AC) to DC. Each of the plurality of Active Front End units can be adapted to rectify an AC voltage to a DC voltage and to supply the DC voltage to the DC bus. The DC bus can be adapted to be electrically coupled to an inverter adapted to provide power to the AC motor.

BRIEF DESCRIPTION OF THE DRAWINGS

A wide variety of potential embodiments will be more readily understood through the following detailed description of certain exemplary embodiments, with reference to the accompanying exemplary drawings in which.

DEFINITIONS

Figure 1:
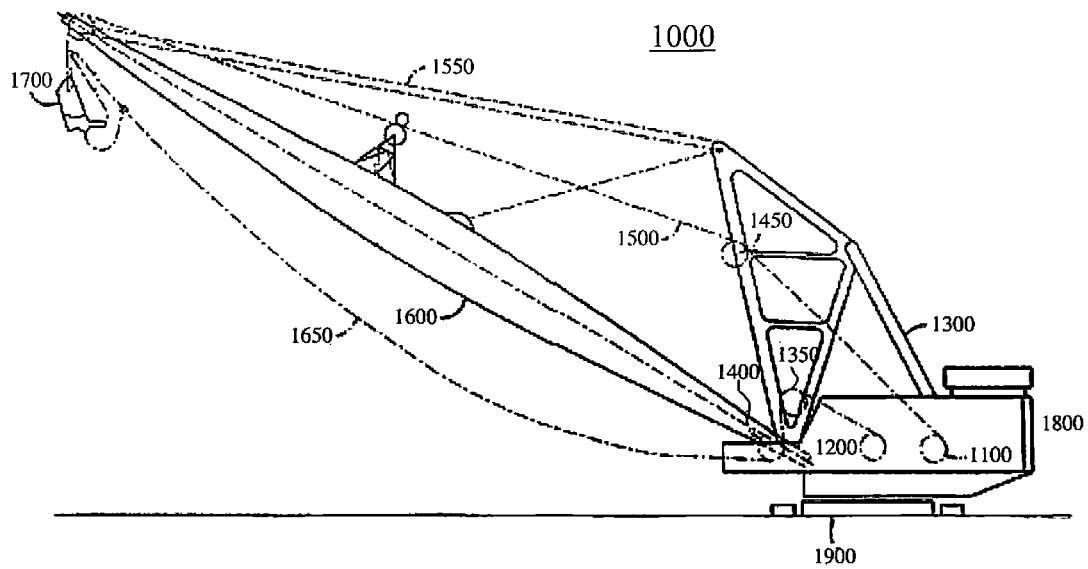
FIG. 1 is a side view of an exemplary embodiment of a machine 1000.

When the following terms are used substantively herein, the accompanying definitions apply:

a—at least one.

Active Front End unit—a self-commutated, actively controlled line converter; a self-commutated infeed/regenerative feedback unit adapted to convert an alternating current to a direct current.

activity—an action, act, step, and/or process or portion thereof adapted to—made suitable or fit for a specific use or situation.

alternating current (AC)—an electric current that reverses direction in a circuit at regular intervals.

apparatus—an appliance or device for a particular purpose.

apply—put into service.

associated with—related to.

asynchronous motor—a rotating device powered by electricity wherein phase differences between three phases of an electrical supply create a rotating electromagnetic field in the device. The device comprises a rotor and a stator. Through electromagnetic induction, the rotating magnetic field induces a current in stator windings, which in turn sets up a counterbalancing magnetic field that causes the rotor to turn in the direction the field is rotating. The rotor rotates slower than the rotating magnetic field produced by the electrical supply.

automatically—performed via an information device in a manner essentially independent of influence or control by a user.

below—less than.

bus—an electrical conductor adapted to transfer electrical energy.

calculating—determining via mathematics and/or logical rules.

can—is capable of, in at least some embodiments.

change—to cause a difference to occur.

closest—most nearly.

communicate—to exchange information.

communicative coupling—linking in a manner that facilitates communications.

comparing—examining in order to note similarities or differences between at least two items.

comprising—including but not limited to.

control—direct, exercise influence over.

convert—change.

data—distinct pieces of information, usually formatted in a special or predetermined way and/or organized to express concepts.

define—to establish the outline, form, or structure of.

detect—sense or perceive.

determination—decision.

determining—deciding.

device—a machine, manufacture, and/or collection thereof.

Direct Current (DC)—a non-alternating electric current.

directly—without anything intervening.

distinct—distinguishable from others.

dragline-mining machine—a large excavation machine used in surface mining to remove overburden (layers of rock and soil). A typical dragline casts a wire rope-hung bucket a considerable distance, collects the dug material by pulling (dragging) the bucket toward itself on the ground with a second wire rope (or chain), elevates the bucket, and dumps the material on a spoil bank, in a hopper, and/or on a pile, etc.

drive—a means by which power is transmitted.

duty cycle—a fraction of time a system is actually employed in performing a function; a percentage of time a DC voltage is substantially non-zero.

electrical motor—a motion-imparting device powered by electricity.

electrical—pertaining to electricity.

electrically coupled—connected in a manner adapted to transfer electrical energy.

energized—supplied with an electrical current.

event—an occurrence.

execute—run a computer program or instruction.

field exciter—a device adapted to start a synchronous motor.

finding—determining.

fixed—substantially unchanged over a time period.

fixed rate—a frequency of occurrence substantially unchanging with time.

harmonic distortion—for an AC power signal, the ratio of a sum of the powers of all harmonic frequencies above and/or below a fundamental current frequency to the power of the fundamental current frequency.

hoist—a system comprising motor adapted to at least vertically move a bucket of a dragline-mining machine.

identify—determine.

individually—of or relating to a distinct entity.

inductors—a device adapted to induce current in an electrical circuit via a changing magnetic flux.

information—data that has been organized to express concepts. It is generally possible to automate certain tasks involving the management, organization, transformation, and/or presentation of information.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise well-known components such as one or more network interfaces, one or more processors, one or more memories containing instructions, and/or one or more input/output (I/O) devices, one or more user interfaces coupled to an I/O device, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instructions—directions adapted to perform a particular operation or function.

Insulating Gate Bipolar Transistor (IGBT)—a power semiconductor device that has identical operation to a bipolar transistor, but has a field effect type gate, so that a gate-emitter voltage is applied to make it conductive, no current needs to be injected. When gate-emitter voltage is very low the device switches off. The commutations are typically faster than with a bipolar transistor and typically a little slower than with a MOSFET.

inverter—a device that converts DC power to AC power or AC power to DC power.

machine readable medium—a physical structure from which a machine can obtain data and/or information. Examples include a memory, punch cards, etc.

managing—controlling.

manually—substantially without assistance of an information device.

may—is allowed to, in at least some embodiments.

measure—characterize by physically sensing.

measurement—a value of a variable, the value determined by manual and/or automatic observation.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

mine—an excavation in the earth from which materials can be extracted.

network—a communicatively coupled plurality of nodes.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

obtain—to acquire, get, receive, calculate, and/or determine.

operational—in service.

operator—an entity able to control a machine.

optimizing—improving.

parameter—a sensed, measured, and/or calculated value.

phase angle—an angle expressing a phase relation between an AC current and an AC voltage.

plurality—the state of being plural and/or more than one.

power—a measure of energy and/or work.

power events—power affecting changes in voltage and/or current.

predetermined—established in advance.

predetermined threshold—a standard established in advance.

pre-set—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—supply.

range—an amount or extent of variation.

rate—frequency of an occurrence.

reactive AC current—a measure a vectorial and/or imaginary component of an alternating current not adapted to perform work.

related—associated with.

remaining—not activated in a present cycle.

rendered—made perceptible to a human. For example data, commands, text, graphics, audio, video, animation, and/or hyperlinks, etc. can be rendered. Rendering can be via any visual and/or audio means, such as via a display, a monitor, electric paper, an ocular implant, a speaker, and/or a cochlear implant, etc.

resist—to stand and/or act against an action, effect, and/or force.

responsive—reacting to an influence and/or impetus.

rotation—an act or process of turning around a center or an axis.

save—retain data in a memory device.

secondary winding—a wire coil comprised in a transformer adapted to receive transferred energy induced from an alternating current conducted through a primary winding comprised in the transformer.

separate—distinct.

sequential—following in time.

server—an information device and/or software that provides some service for other connected information devices via a network.

set—a related plurality.

stagger angle—a phase angle between times for switching on Active Front End units.

start—begin.

starting—beginning rotation from a stationary position.

step up—change by an incremental amount.

store—to place, hold, and/or retain data, typically in a memory.

stored—placed, held, and/or retained in a memory.

subsequent—following in time.

subset—a set comprised in a larger set.

substantially—to a great extent or degree.

subsystem—a system that is comprised in a larger system.

supply—make available for use.

switching—turning on and/or off.

synchronous motor—motor having a speed directly proportional to the frequency of the alternating-current power that operates it.

system—a collection of mechanisms, devices, data, and/or instructions, the collection designed to perform one or more specific functions.

transformer—a device adaptable to transfer electric energy from one circuit to another. A transformer can comprise a pair of multiply wound, inductively coupled wire coils that effect such a transfer with a change in voltage, current, phase, and/or other electric characteristic.

user—a person interfacing with an information device.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.
value—an assigned or calculated numerical quantity.
variable—changeable.
voltage—a magnitude of an electrical potential.
wave—a disturbance, variation, and/or incident that causes the transfer electrical energy progressively from point to point in a medium.
waveform—a profile, graph, and/or visual model of variations of voltage and/or current over time.
winding—a coil of wire.
within—inside.

DETAILED DESCRIPTION

Certain exemplary embodiments can comprise a system comprising a plurality of Active Front End units adapted to be electrically coupled to a direct current (DC) bus. Each of the plurality of Active Front End units can be adapted to be electrically coupled to a separate winding of a transformer of a plurality of transformers. Each of the plurality of Active Front End units can be adapted to convert alternating current (AC) voltage to a DC voltage. Each of the plurality of Active Front End units can be adapted to supply the DC voltage to the DC bus. The DC bus can be adapted to be electrically coupled to a plurality of inverters.

Certain exemplary embodiments can comprise a method for managing and/or resisting harmonic distortion associated with supplying power to an AC motor associated with a machine. The method can comprise, responsive to a determination that an electrical variable is not within a predetermined range, automatically switching an Active Front End unit of a plurality of Active Front End units electrically coupled to a DC bus, the Active Front End unit adapted to apply a DC voltage on the DC bus, the Active Front End unit switched on at a rate with a duty cycle, the Active Front End unit electrically coupled to a transformer winding.

Certain exemplary embodiments comprise excavating machines used in mining operations such as the extraction of coal, iron, copper or other minerals or materials. Excavating machines can comprise dragline-mining machines, electric mining shovels, bucket wheel excavators, bore miners, and/or continuous, miners, etc. An excavating machine can comprise a machine compartment providing platform supported for rotation. For certain machines, the machine compartment can comprise a boom supported by cables or lines, which can be held at an angle of inclination by pendants extending from the boom to a gantry mounted on top of the machine compartment. Certain machines can comprise a bucket, which can be suspended from the boom by hoist ropes wound on hoist drums in the machine compartment. In certain exemplary embodiments, the bucket can be dragged toward the dragline excavating machine by coordinated motion of hoist ropes drag ropes. Drag ropes can be wound on drums comprised in the machine compartment. The machine compartment can comprise drive systems for driving hoist, drag motors, walk motors, and/or "swing" motors. The motors can be adapted to control excavation, rotate the machine compartment and/or to move a particular excavating machine. Power to operate excavating machines can be obtained via alternating current (AC) utility power lines.

FIG. 1 is a side view of an exemplary embodiment of a machine 1000, which can comprise a machine compartment 1800. Machine 1000 can comprise a boom 1600 projecting upwardly from the lower front of machine compartment 1800. Boom 1600 can be held at an angle of inclination by means of pendants 1550 extending from boom 1600 to a gantry 1300, which can be mounted on top of machine compartment 1800. A bucket 1700 can be suspended by hoist ropes 1500 which can pass over a sheave 1450 and wind on a hoist drum 1100. Bucket 1700 can be dragged toward the dragline excavating machine 1000 by drag ropes 1650, which can pass over fairleads 1350 near boom foot pins 1400 and onto drag drums 1200. Machine 1000 can be mounted on a walking shoe or walking mechanism 1900, which can allow the dragline excavating machine to be moved from place to place.

Figure 2:
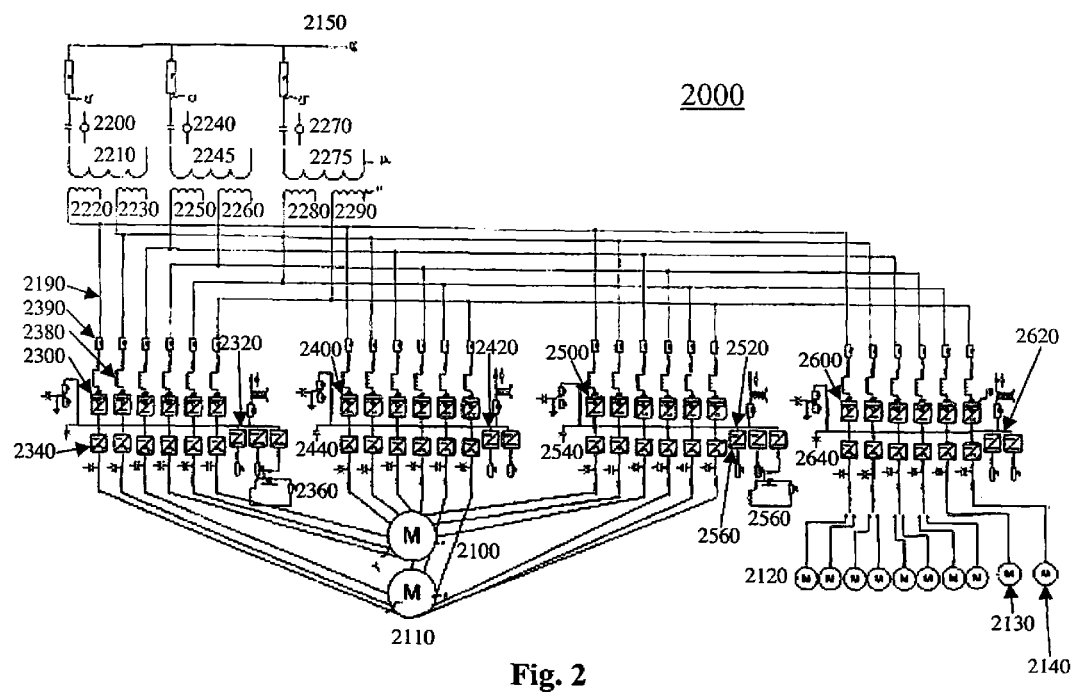
FIG. 2 is a block diagram of an exemplary embodiment of a machine electrical system 2000.

FIG. 2 is a block diagram of an exemplary embodiment of a machine electrical system 2000, which can comprise a synchronous hoist motor 2100 and/or a synchronous drag motor 2110. In certain exemplary embodiments, hoist motor 2100 and/or drag motor 2110 can comprise a plurality of winding segments. A powered circuit can be adapted to operate each of hoist motor 2100 and drag motor 2110 to provide motion for certain pieces of machinery. For example, Hoist motor 2100 can be adapted to provide motive force to a hoist, such as by turning hoist drum 1100 of FIG. 1. Drag motor 2110 can be adapted to provide motive force for a drag motion such as by providing power to drag drum 1200 of FIG. 1. Field exciters, such as field exciter 2360 and field exciter 2560, can be adapted to start rotation of each of hoist motor 2100 and hoist motor 2110.

Certain exemplary embodiments can comprise a plurality of non-operating asynchronous three phase motors 2120, each of which can comprise a single winding segment. System 2000 can comprise a plurality of operating asynchronous three phase motors 2130, 2140. Motors 2120, 2130, 2140 can be cycled on and off according to needs based upon machine motion and digging cycles. For example, plurality of asynchronous motors 2120, 2130, 2140 can be adapted to provide motive force to transversely move a machine, such as by driving walking mechanism 1900 of machine 1000 of FIG. 1. Asynchronous motors 2120, 2130, 2140 can be adapted to provide motive force to devices adapted to provide a swinging motion to a boom, such as boom 1600 of machine 1000 of FIG. 1.

To provide power to motors, such as hoist motor 2100 and/or drag motor 2110, a plurality of inductors 2380 can step up an AC voltage supplied via a primary AC bus 2150 and a plurality of secondary AC buses 2190 via a plurality of transformers 2200, 2240, 2270. An alternating current associated with the AC voltage can be measured at a plurality of current transformers 2390, which can be adapted to measure total, active, and/or reactive current values. Each of transformers 2200, 2240, 2270 can comprise a respective set of primary windings 2210, 2245, 2275. Transformer 2200 can comprise secondary windings 2220, 2230. Transformer 2240 can comprise secondary windings 2250, 2260. Transformer 2270 can comprise secondary windings 2280, 2290. Each of secondary windings 2220, 2230, 2250, 2260, 2280, 2290 can be electrically coupled to a plurality of DC buses 2320, 2420, 2520, 2620. An AC voltage provided via transformers 2200, 2240, 2270 can be managed and/or rectified by a plurality of Active Front End units 2300, 2400, 2500, 2600 to provide one or more predetermined DC voltages to respective DC buses 2320, 2420, 2520, 2620.

In certain exemplary embodiments, for a particular DC bus such as DC bus 2320, each of plurality of electrically coupled Active Front End units 2300 can receive an AC voltage from a predetermined distinct secondary winding comprised in plurality of transformers 2200, 2240, 2270. Receiving the AC voltage from predetermined distinct secondary windings can retard a direct current associated with DC bus 2320 from flowing to transformers 2200, 2240, 2270 as the AC voltage cycles below the DC voltage of DC bus 2320.

When measurements associated with any of plurality of DC buses 2320, 2420, 2520, 2620 are determined not to be within respective predetermined ranges, one or more corresponding Active Front End units 2300, 2400, 2500, 2600 can apply a voltage to at least one of DC buses 2320, 2420, 2520, 2620 and/or can remove power from at least one of DC buses 2320, 2420, 2520, 2620. For example, when electric motors 2100, 2110, 2120, 2130, 2140 operate to generate electrical power, Active Front End units can act to feed AC power to AC bus 2150 via transformers 2200, 2240, 2270.

DC buses 2320, 2420, 2520, 2620 can be electrically coupled to a DC chopper. For example DC chopper 2560 can be electrically coupled to DC bus 2500. DC chopper 2560 can be adapted to reduce a DC voltage associated DC bus 2500 responsive to a determination that the DC voltage exceeds a predetermined threshold.

Active Front End unit switching can take place at a rate to regulate DC voltage values associated with DC buses 2320, 2420, 2520, 2620. Each of plurality of Active Front End units 2300, 2400, 2500, 2600 can switch on and off at a predetermined frequency and/or variable duty cycle, either of which can be based upon the voltage and/or current values and/or waveforms associated with AC bus 2150 and/or DC buses 2320, 2420, 2520. In certain exemplary embodiments, the predetermined frequency and/or variable duty cycle can be based upon a programmed need for line VARs. In certain exemplary embodiments, predetermined frequency and variable duty cycle can be based upon a number of Active Front End units and a load from devices electrically comprised in and/or coupled to system 2000. Plurality of Active Front End units 2300, 2400, 2500, 2600 can be adapted to provide a relatively quick response to load changes in system 2000. In certain exemplary embodiments, plurality of Active Front End units 2300, 2400, 2500, 2600 can respond to a load change in system 2000 at a rate of 7.5 times a line frequency associated with AC bus 2150. For example, for a line frequency of 60 Hz, plurality of Active Front End units 2300, 2400, 2500, 2600 can respond to a load change in system 2000 in $\frac{1}{450}^{th}$ of a second.

Each of plurality of Active Front End units 2300, 2400, 2500, 2600 can be adapted to convert an AC voltage to a DC voltage at a fixed voltage level. The DC voltage transferred to DC buses 2320, 2420, 2520, 2620 can be converted to a variable AC frequency via a plurality of inverters 2340, 2440, 2540, 2640. The variable AC frequency can be adapted to drive AC motors and to vary the speed and/or the torque of AC motors.

Harmonic distortion associated with AC bus 2150 can be managed and/or resisted via utilization of a plurality of Active Front End units for each DC bus. Plurality of Active Front End units 2300, 2400, 2500, 2600 electrically coupled to distinct predetermined transformer windings, such as secondary windings 2220, 2240, 2270, can isolate AC bus 2150 from feedback associated with switching plurality of Active Front End units 2300, 2400, 2500, 2600. Certain exemplary embodiments can comprise a "minimal factor" of Active Front End units. For example, in system 2000, eighteen Active Front End units can be associated with hoist motor 2100 and drag motor 2110.

Managing and/or resisting harmonic distortion can result in less heat emitted from transformers 2200, 2240, 2270, a larger K factor for transformers 2200, 2240, 2270, and/or fewer transformers 2200, 2240, 2270 for certain mining machines. In certain exemplary embodiments, transformer sizes can be increased as compared to systems comprising only a single Active Front End unit electrically coupled to each DC bus.

In certain exemplary embodiments, a plurality of inverters 2340, 2440, 2540, 2640 can be electrically coupled to respective DC buses 2320, 2420, 2520, 2620. Each plurality of inverters 2340, 2440, 2540, 2640 can receive a DC voltage and convert the DC voltage to an AC voltage with a predetermined and/or selectably variable frequency.

Synchronous motors, such as hoist motor 2100 and drag motor 2110, can be three phase motors and can comprise 3 segments per winding. Asynchronous motors, such as plurality of asynchronous motors 2120, 2130, 2140, can be three phase motors and can comprise one segment per winding. Asynchronous motors 2120, 2130, 2140 can be adapted to receive an alternating current comprising a variable frequency and variable voltage.

In an exemplary embodiment of this invention, a method for managing and/or resisting the harmonic distortion can comprise staggering a timing of at least one Active Front End unit of the plurality of Active Front End units 2300, 2400, 2500, 2600 via a stagger angle, which can be determined by dividing a 360 degree cycle by a quantity of Active Front End units operating and/or electrically coupled to DC buses 2320, 2420, 2520, 2620.

The superimposed stagger angle can be determined by dividing 360 degrees by a total quantity of operating Active Front End units comprised in system 2000. For example, if hoist motor 2100 is operating, but none of plurality of asynchronous motors 2120, 2130, 2140 are operating, Active Front End units coupled to buses 2320, 2420, 2520 providing power to hoist motor 2100 can switch based upon a stagger angle of 20 degrees (=360 degrees÷18 AFE's) relative to at least one other coupled Active Front End unit. If neither of hoist motor 2100 and drag motor 2110 are operating, a stagger angle for at least one of plurality of Active Front End units 2600 coupled to plurality of asynchronous motors 2120, 2130, 2140 can be 60 degrees (=360 degrees÷6 AFE's) relative to at least one other of plurality of Active Front End units 2600. If at least one of hoist motor 2100 and drag motor 2110 is operating, and at least one of plurality of asynchronous motors 2120, 2130, 2140 is operating, a stagger angle of at least one Active Front End unit of plurality of Active Front End units 2300, 2400, 2500, 2600 can be switched with a superimposed stagger angle of 15 degrees (=360 degrees÷24 operating AFE's).

Figure 3:
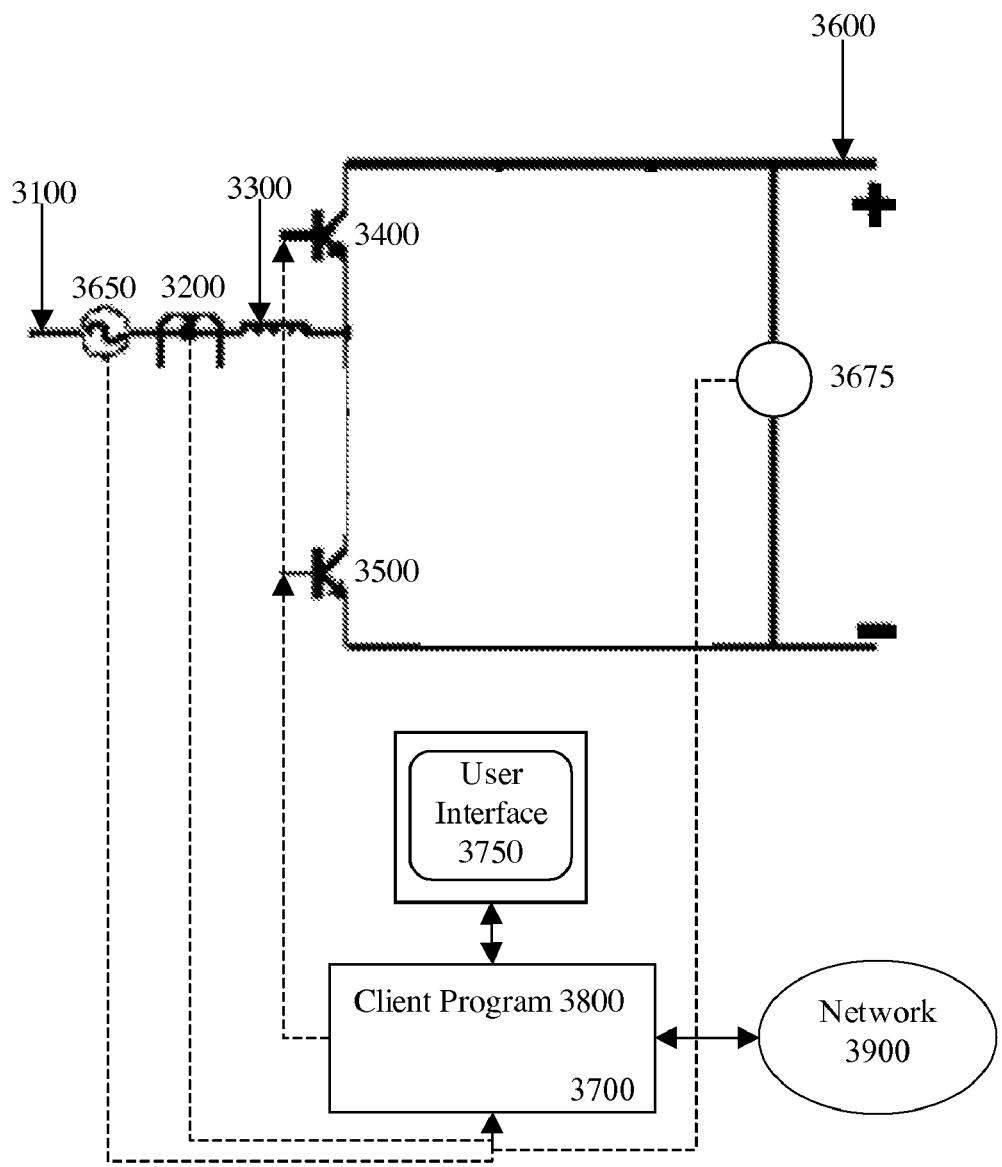
FIG. 3 is a schematic diagram of an exemplary embodiment of a system 3000.

FIG. 3 is a schematic diagram of an exemplary embodiment of an system 3000, which can comprise a source of alternating current 3100. A voltage sensor 3650 can be adapted to measure an AC voltage of alternating current 3100, such as on an AC bus, on a primary side of a voltage transformer, and/or on a secondary side of the voltage transformer. Alternating current flowing from source of alternating current 3100 can be measured via a current transformer 3200, which can be located on a primary side of a voltage transformer and/or on a secondary side of the voltage transformer. System 3000 can comprise an inductor 3300, which can be adapted to step up an AC voltage fed to transistors 3400, 3500, which can be power switching devices such as IGBT (insulated gate bipolar transistor), IGCT (integrated gate commutated transistors), and/or IEGT (injection enhanced gate transistor) technology, etc.

Transistors 3400, 3500 can be adapted to rectify an AC voltage to provide a DC voltage to a DC bus 3600. A sensor 3675 can be adapted to measure a value of a variable, such as a voltage or a current associated with DC bus 3600. Current transformer 3200, voltage sensor 3650, and/or sensor 3675 can be communicatively coupled to an information device 3700. Information device 3700 can be adapted to switch transistors 3400, 3500 responsive to signals from current transformer 3200 voltage sensor 3650, and/or sensor 3675. For example, transistors 3400, 3500 can be switched on responsive to a voltage value detected by sensor 3675 being below a predetermined threshold. Information device 3700 can change a duty cycle of transistors 3400, 3500 responsive to a provided, obtained, calculated, and/or determined total, active, and/or a reactive current value, a voltage value, such as a voltage measured by voltage sensor 3650, and/or an electrical value, such as a voltage and/or a current measured by sensor 3675.

Information device 3700 can be communicatively coupled to a plurality of information devices via network 1900. Network 1900 can be a network that is public, private, circuit-switched, packet-switched, connection-less, virtual, radio, telephone, POTS, non-POTS, PSTN, non-PSTN, cellular, cable, DSL, satellite, microwave, twisted pair, IEEE 802.03, Ethernet, token ring, local area, wide area, IP, Internet, intranet, wireless, Ultra Wide Band (UWB), Wi-Fi, BlueTooth, Airport, IEEE 802.11, IEEE 802.11a, IEEE 802.11b, IEEE 802.11g, X-10, and/or electrical power networks, etc., and/or any equivalents thereof. Instructions can be provided to information device 3700 to switch transistors 3400, 3500 via an information device communicatively coupled to network 3900.

Figure 4:
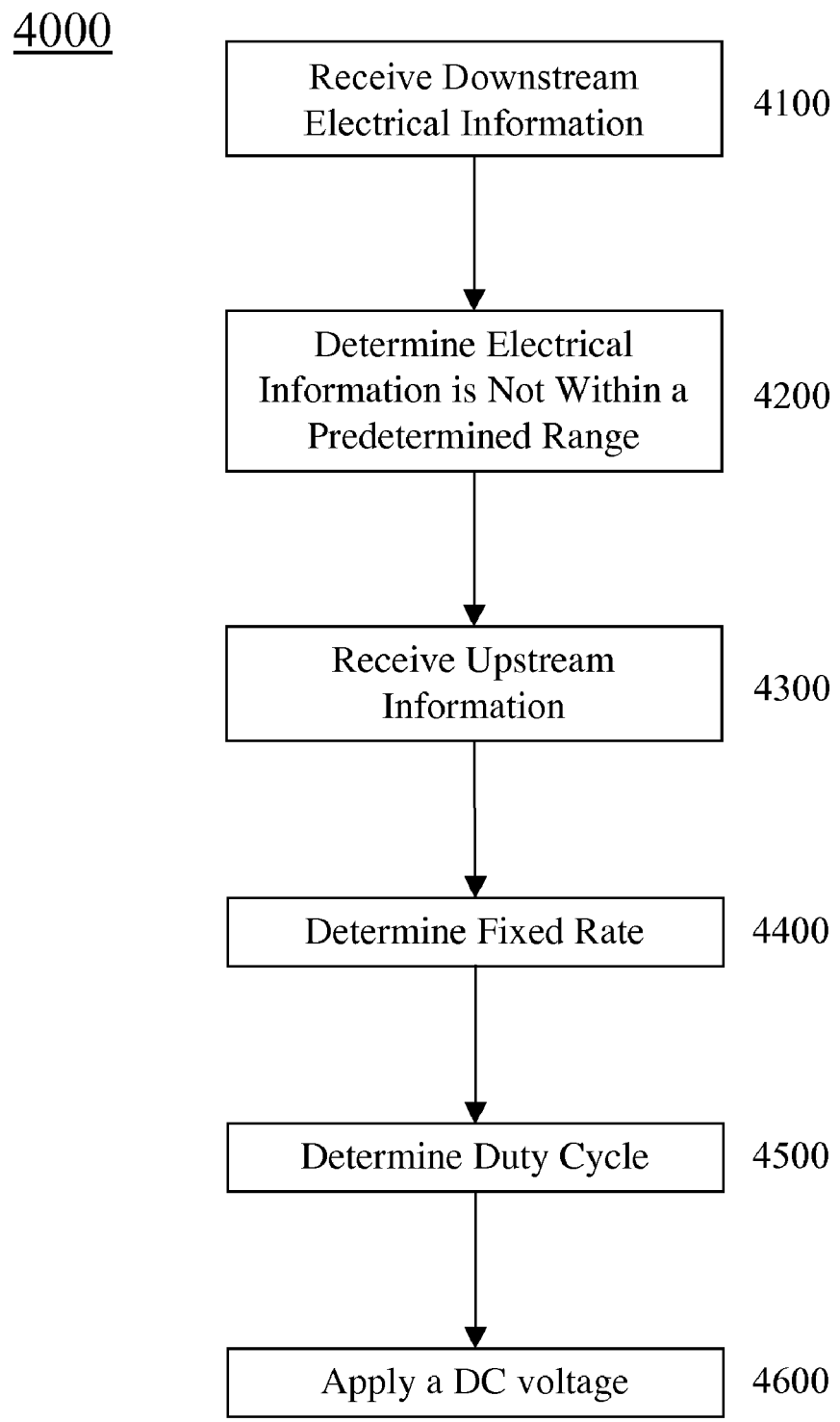
FIG. 4 is a flowchart of an exemplary embodiment of a method 4000.

FIG. 4 is a flowchart of an exemplary embodiment of a method 4000. At activity 4100, information can be received regarding electrical information measured and/or determined downstream of a plurality of Active Front End units communicatively coupled to a DC bus associated with a machine. For example, information regarding an DC bus voltage, DC bus current, inverter, AC bus voltage, AC bus active current, AC motor, and/or AC total, active, and/or reactive current can be received from one or more measuring devices.

At activity 4200, a determination can be made that at least one value regarding the downstream electrical information is not within a predetermined range. For example, a determination can be made that the DC bus voltage is not within a predetermined range.

At activity 4300, information can be received regarding upstream electrical circuitry. For example, a voltage and/or current measurement can be made at an AC bus feeding at least one transformer primary winding and/or a voltage or current measurement directly related to one or more of a plurality of AC buses electrically coupled to transformer secondary windings.

At activity 4400, a fixed rate associated with an Active Front End unit can be determined. In certain exemplary embodiments, the fixed rate can be determined based upon a stagger angle. The stagger angle can be determined by dividing a 360 degree cycle by a number of Active Front End units operating on and/or associated with the machine. The stagger angle can be pre-set to manage pre-calculated AC harmonic distortions expected to be caused and/or tested to be caused by predetermined power events on the DC bus.

At activity 4500, a variable duty cycle associated with an Active Front End can be determined. In certain exemplary embodiments, a plurality of variable duty cycles associated with a plurality of Active Front End units can be determined. For example, each variable duty cycle of the plurality of variable duty cycles can be determined based upon a DC bus voltage value. Each variable duty cycle of the plurality of variable duty cycles can be associated with a predetermined Active Front End unit. In certain exemplary embodiments, each variable duty cycle of the plurality of variable duty cycles can be the same for each of the plurality of Active Front End units for a particular time interval. In certain exemplary embodiments, each variable duty cycle of the plurality of variable duty cycles can be distinct for one or more of the plurality of Active Front End units for a particular time interval. In certain exemplary embodiments, one or more of the plurality of variable duty cycles can be changed to manage a phase angle associated with an AC voltage and current.

In certain exemplary embodiments, one or more of the plurality of variable duty cycles can be determined responsive to a determination that a synchronous motor and/or an asynchronous motor associated with the machine is starting up or shutting down. For example, at least one of the plurality of duty cycles can be changed responsive to a determination that a field exciter associated with a synchronous motor is being energized.

At activity 4600, an AC voltage can be rectified to a DC voltage. The DC voltage can be rectified and applied to the DC bus via an Active Front End unit of a plurality of Active Front End units. Each of the plurality of Active Front End units can be electrically coupled to the DC bus. The Active Front End unit can be switched on at the fixed rate with for the variable duty cycle. The Active Front End unit can be electrically coupled to a transformer winding, such as a predetermined distinct transformer winding. DC voltages from each of the plurality of Active Front End units can be sequentially applied to the DC bus, thereby switching each of the plurality of Active Front End units during a predetermined time period. Each of the plurality of Active Front End units can be switched at a predetermined fixed rate for an automatically determined variable duty cycle.

Figure 5:
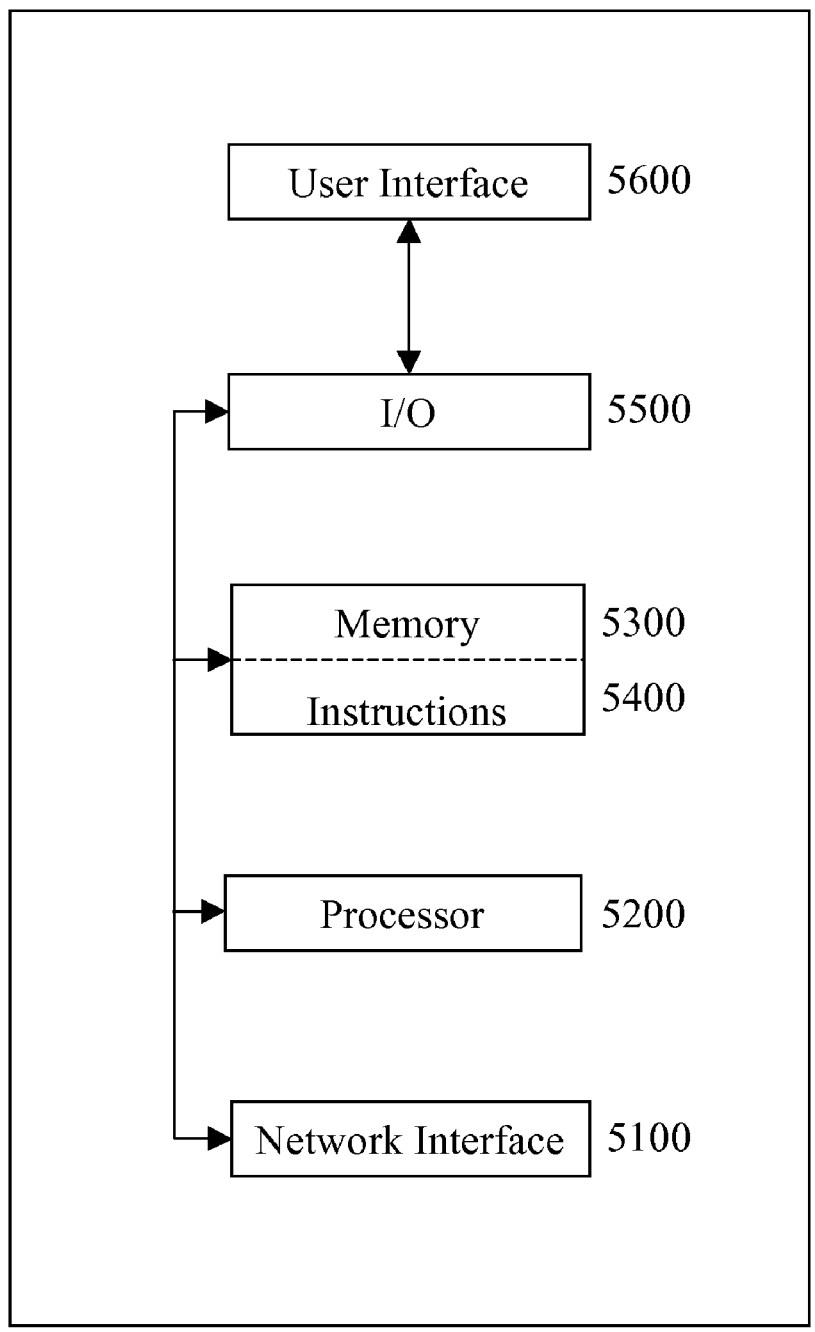
FIG. 5 is a block diagram of an exemplary embodiment of an information device 5000.

FIG. 5 is a block diagram of an exemplary embodiment of an information device 5000, which in certain operative embodiments can comprise, for example, information device 3700 of FIG. 3. Information device 5000 can comprise any of numerous components, such as for example, one or more network interfaces 5100, one or more processors 5200, one or more memories 5300 containing instructions 5400, one or more input/output (I/O) devices 5500, and/or one or more user interfaces 5600 coupled to I/O device 5500, etc.

In certain exemplary embodiments, via one or more user interfaces 5600, such as a graphical user interface, a user can view a rendering of information related to switching a plurality of Active Front End units electrically coupled to a DC bus.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method comprising:
responsive to a determination that a phase angle is not within a predetermined range, automatically changing a duty cycle of at least a selected Active Front End unit of a plurality of Active Front End units, said phase angle calculated from a measured voltage on an AC bus adapted to provide AC power to said plurality of Active Front End units and a measured current directly associated with said selected Active front End unit, each Active Front End unit from said plurality of Active Front End units adapted to be electrically coupled to a DC bus and to apply a DC voltage on said DC bus, each Active Front End unit switched on at a fixed rate and for an individually variable duty cycle, a stagger angle of said plurality of Active Front Ends pre-set to manage AC harmonic distortions caused by predetermined power events on said DC bus.

2. The method of claim 1, further comprising:
responsive to a determination that a measured voltage on said DC bus is not within a predetermined voltage range, automatically changing at least one of said individually variable duty cycles.

3. The method of claim 1, further comprising:
automatically determining that a measured voltage on said DC bus is not within a predetermined voltage range.

4. The method of claim 1, further comprising:
after switching a predetermined Active Front End unit of said plurality of Active Front End units, sequentially switching each of a predetermined subset of said plurality of Active Front End units electrically coupled to said DC bus, said predetermined subset of Active Front End units not comprising said predetermined Active Front End unit, until each of said predetermined subset of Active Front End units is switched prior to a subsequent switching of said predetermined Active Front End unit.

5. The method of claim 1, further comprising:
automatically determining said duty cycle of at least said selected Active Front End unit.

6. The method of claim 1, further comprising:
increasing said duty cycle of at least said selected Active Front End unit responsive to a determination that an electrical motor is starting.

7. The method of claim 1, further comprising:
increasing said duty cycle of at least said selected Active Front End unit responsive to a determination that a synchronous electrical motor is starting.

8. The method of claim 1, further comprising:
increasing said duty cycle of at least said selected Active Front End unit responsive to a determination that an asynchronous electrical motor is starting.

9. The method of claim 1, further comprising:
increasing said duty cycle of at least said selected Active Front End unit responsive to a determination that a field exciter is being energized.

10. The method of claim 1, further comprising:
determining said duty cycle of at least said selected Active Front End unit based upon a measured DC voltage associated with said DC bus.

11. The method of claim 1, further comprising:
determining said fixed rate based upon a total count of operational Active Front End units comprised in a machine.

12. The method of claim 1, further comprising:
determining said stagger angle.

13. The method of claim 1, further comprising:
obtaining AC current values associated with each of said plurality of Active Front End units electrically coupled to said DC bus.

14. The method of claim 1, further comprising:
calculating said phase angle.

15. The method of claim 1, wherein:
determining said duty cycle of at least said selected Active Front End unit based upon a measured electrical value associated with an inverter associated with a dragline-mining machine.

16. The method of claim 1, further comprising:
determining said duty cycle of at least said selected Active Front End unit based upon a measured electrical value associated with an electrical motor associated with a machine comprising said plurality of Active Front End Units.

17. The method of claim 1, further comprising:
receiving instructions adapted to control switching of said plurality of Active Front End units via an information device.

18. A system comprising:
a plurality of Active Front End units adapted to be electrically coupled to a direct current (DC) bus, each of said first plurality of Active Front End units adapted to be electrically coupled to a predetermined distinct winding from a plurality of windings of a first transformer, each of said first plurality of Active Front End units adapted to convert alternating current (AC) to DC, each of said first plurality of Active Front End units adapted to supply DC to said DC bus, said DC bus adapted to be electrically coupled to a plurality of inverters, said plurality of inverters adapted to be electrically coupled to a synchronous AC motor, said plurality of inverters a first set of a plurality of sets of inverters adapted to be electrically coupled to a synchronous AC motor, each of said plurality of sets of inverters adapted to be operatively coupled to a distinct DC bus, each distinct DC bus adapted to be operatively coupled to a distinct winding segment of said synchronous AC motor.

19. The system of claim 18, further comprising:
a DC chopper adapted to be operatively coupled to said DC bus, said DC chopper adapted to reduce a DC voltage associated with said DC bus responsive to a determination that said DC voltage exceeds a predetermined threshold.

20. A method comprising:
electrically coupling a plurality of Active Front End units to a direct current (DC) bus, each of said plurality of Active Front End units adapted to be electrically coupled to a predetermined distinct winding from a plurality of windings of a first transformer, each of said plurality of Active Front End units adapted to convert alternating current (AC) to DC, each of said plurality of Active Front End units adapted to supply DC to said DC bus, said DC bus adapted to be electrically coupled to a first plurality of inverters, said first plurality of inverters adapted to be electrically coupled to a synchronous AC motor, said first plurality of inverters a first set of a plurality of sets of inverters adapted to be electrically coupled to a synchronous AC motor, each of said plurality of sets of inverters adapted to be operatively coupled to a distinct DC bus, each distinct DC bus adapted to be operatively coupled to a distinct winding segment of said synchronous AC motor.

21. A machine-readable medium comprising machine-implementable instructions for activities comprising:

responsive to a determination that a phase angle is not within a predetermined range, automatically changing a duty cycle of at least a selected Active Front End unit of a plurality of Active Front End units, said phase angle calculated from a measured voltage on an AC bus adapted to provide AC power to said plurality of Active Front End units and a measured current directly associated with said selected Active front End unit, each Active Front End unit from said plurality of Active Front End units adapted to be electrically coupled to a DC bus and to apply a DC voltage on said DC bus, each Active Front End unit switched on at a fixed rate and for an individually variable duty cycle, a stagger angle of said plurality of Active Front Ends pre-set to manage AC harmonic distortions caused by predetermined power events on said DC bus, said stagger angle determined via division of a 360 degree cycle by a count of operating Active Front End units of said plurality of Active Front End units.

* * * * *